United States Patent
Cocchi et al.

(10) Patent No.: US 8,561,839 B2
(45) Date of Patent: Oct. 22, 2013

(54) MACHINE FOR MAKING AND DISPENSING ICED FOOD PRODUCTS

(75) Inventors: Andrea Cocchi, Calderara Di Reno (IT); Roberto Lazzarini, Reggio Emilia (IT)

(73) Assignee: Ali S.p.A.—Divisione GBG (IT)

( * ) Notice: Subject to any disclaimer, the term of this patent is extended or adjusted under 35 U.S.C. 154(b) by 265 days.

(21) Appl. No.: 13/033,304

(22) Filed: Feb. 23, 2011

(65) Prior Publication Data
US 2011/0239669 A1  Oct. 6, 2011

(30) Foreign Application Priority Data
Mar. 30, 2010  (IT) .............................. BO2010A0195

(51) Int. Cl.
*B67B 7/00* (2006.01)

(52) U.S. Cl.
USPC ............... 222/1; 222/36; 222/146.6; 222/30; 62/390; 62/125; 137/551

(58) Field of Classification Search
USPC .......................... 222/30, 36, 40, 146.6, 146.1; 62/389–390, 394, 392, 125; 137/551
See application file for complete search history.

(56) References Cited

U.S. PATENT DOCUMENTS

| | | | |
|---|---|---|---|
| 4,478,355 A | | 10/1984 | Houman |
| 4,712,920 A | | 12/1987 | Ames |
| 4,736,871 A | * | 4/1988 | Luciani et al. ................... 222/25 |
| 5,115,942 A | * | 5/1992 | Merrill et al. ..................... 222/1 |
| 5,335,705 A | * | 8/1994 | Morishita et al. ............. 141/275 |
| 5,957,040 A | | 9/1999 | Feola |
| 6,427,871 B1 | | 8/2002 | Suero |
| 6,446,835 B1 | * | 9/2002 | Ford ................................ 222/56 |
| 6,662,573 B2 | * | 12/2003 | Hawkins et al. .................. 62/59 |
| 7,152,765 B1 | * | 12/2006 | Midden et al. ................ 222/511 |
| 2001/0050004 A1 | | 12/2001 | Ugolini |

FOREIGN PATENT DOCUMENTS

| | | |
|---|---|---|
| CN | 201018877 | 2/2008 |
| EP | 1849368 | 10/2007 |
| EP | 1905730 | 4/2008 |
| EP | 1477455 | 5/2009 |
| EP | 2062481 | 5/2009 |
| FR | 2770505 | 5/1999 |
| GB | 2261208 | 5/1993 |
| JP | 2001178370 | 7/2001 |
| WO | 02/12112 | 2/2002 |
| WO | 03/082022 | 10/2003 |
| WO | 20091034592 | 3/2009 |

OTHER PUBLICATIONS

Search Report dated Jan. 3, 2011 from counterpart Italian application.

* cited by examiner

*Primary Examiner* — Paul R Durand
*Assistant Examiner* — Andrew P Bainbridge
(74) *Attorney, Agent, or Firm* — Timothy J. Klima; Shuttleworth & Ingersoll, PLC

(57) ABSTRACT

A machine for making and dispensing iced food products such as granitas, sorbets or slush drinks and the like includes a tank for containing and processing the product to be dispensed. A dispensing tap is mounted near the bottom of the tank and a power-driven stirring mechanism and an evaporator of a cooling circuit are both located inside the tank. A counter for counting an amount of product dispensed includes a unit for measuring the amount of product dispensed and a unit for enabling measurement. The measurement enabling unit includes a temperature sensor located at the dispensing tap, along the product dispensing path.

18 Claims, 2 Drawing Sheets

MACHINE FOR MAKING AND DISPENSING ICED FOOD PRODUCTS

This application claims priority to Italian Patent Application BO2010A000195 filed Mar. 30, 2010, the entirety of which is incorporated by reference herein.

BACKGROUND OF THE INVENTION

This invention relates to a machine for making and dispensing iced food products such as granitas, sorbets or slush drinks and the like.

Machines of this kind, commonly known as crushed-ice drink makers or slush machines, generally comprise a transparent tank, in which a fluid is mixed and chilled and eventually dispensed in the form of a granita or slush drink through a tap mounted near the bottom of the tank.

The tank is closed at the top by a removable lid and contains at the bottom of it an evaporator of a cooling circuit and a screw type stirring element.

The tank is generally in the shape of a parallelepiped, with the exception of the bottom of it which is rounded in such a way as to partly surround the substantially cylindrical periphery of the stirrer-evaporator assembly and prevent the formation of zones of stagnant product.

The tank is filled manually from the top by removing the lid and pouring into the tank a fluid mix of syrups and water and/or milk, depending on the flavor of the product to be dispensed.

In some cases, it may be commercially advantageous for a manufacturer of machines of this kind to deliver a machine to a customer under a contract of loan for use.

Under the contract, the customer is obligated to use the machine solely and exclusively with the product mixes or syrups supplied by the machine manufacturer.

Current machines, however, do not give the manufacturer any possibility of checking use of the machine by the customer. More specifically, the manufacturer has no way of ensuring that the customer complies with the contract, that is to say, that the customer uses only the product mixes or syrups supplied by the manufacturer.

SUMMARY OF THE INVENTION

This invention has for an aim to provide a machine for making and dispensing iced food products such as granitas, sorbets or slush drinks and the like and which allows the manufacturer to check use of the machine by the customer. It is, in particular, an aim of the invention to provide a machine for making and dispensing iced food products such as granitas, sorbets or slush drinks and the like and which allows the manufacturer to ensure that the customer uses only the product mixes or syrups supplied by the manufacturer.

The invention accordingly provides a machine for making and dispensing iced food products such as granitas, sorbets or slush drinks and the like comprising the features defined in one or more of the accompanying claims.

BRIEF DESCRIPTION OF THE DRAWINGS

The technical features of the invention are clearly described in the claims below and its advantages are more apparent from the detailed description which follows, with reference to the accompanying drawings which illustrate a preferred, non-limiting example embodiment of the invention and in which:

DESCRIPTION OF THE PREFERRED EMBODIMENTS

Figure 1:
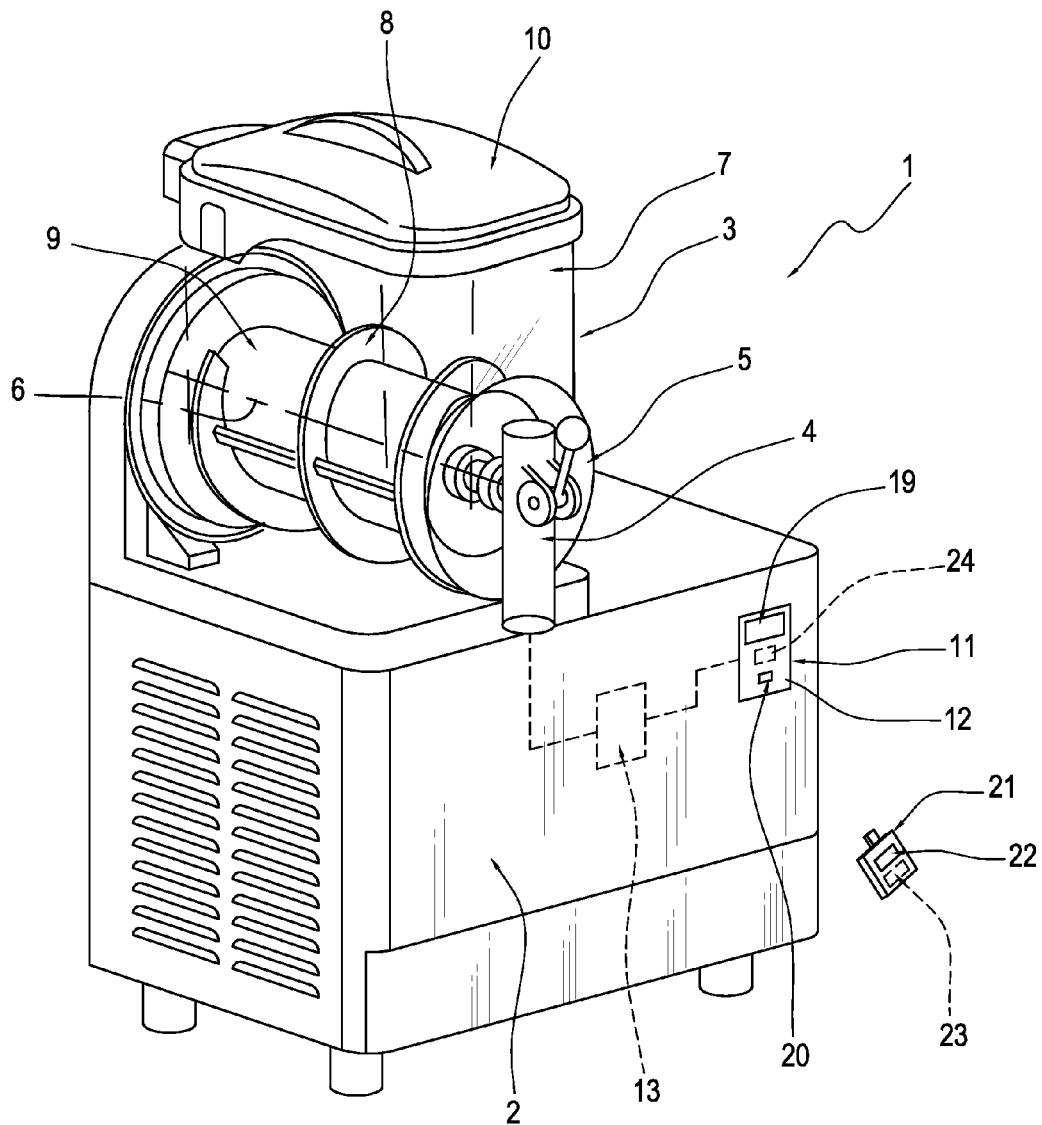
FIG. 1 is a schematic perspective view of a machine made according to this invention.

In FIG. 1, the reference numeral 1 denotes in its entirety a machine for making and dispensing iced food products such as granitas, sorbets or slush drinks and the like.

The machine 1 comprises a base 2 that houses a customary cooling system, not illustrated.

Mounted on the base 2 is a transparent containment tank 3 in which a fluid is processed, or more specifically, mixed and chilled, and eventually dispensed in the form of a granita, sorbet, slush drink or the like, through a tap 4 mounted at the front of the machine 3, near the bottom of the tank 1 itself.

The tank 3 has a substantially cylindrical bottom portion 5 that extends around a horizontal axis 6 and a substantially parallelepiped shaped upper portion 7 that defines an opening for filling the tank 3 from above.

The portion 5 contains and partially surrounds a screw type stirring element 8 and an evaporator 9, the latter forming part of the above mentioned cooling circuit.

The stirrer 8 is rotationally driven about the axis 6, and around the evaporator 9, by a motor, not illustrated, housed in the base 2.

The opening at the top of the portion 7 is closed by a removable lid 10.

The tank 3 is filled manually from the top by temporarily removing the lid 10 and pouring into the tank the product ingredients in loose form, for example a mix of syrups and water and/or milk, depending on the flavor of the product to be dispensed.

In order to give the manufacturer of the machine 1 the possibility of checking machine use by the customer/user, the machine 1 comprises a counter 11 of the amount of product dispensed. More specifically, the counter 11 can provide an instantaneous reading of the total amount of consumer product which has been dispensed from the moment the machine was used for the first time under a particular contract, for example, a contract of loan for use.

The counter 11 is preferably of electronic type, equipped with an external readout panel 12 indicating the aforementioned total amount.

Figure 2:
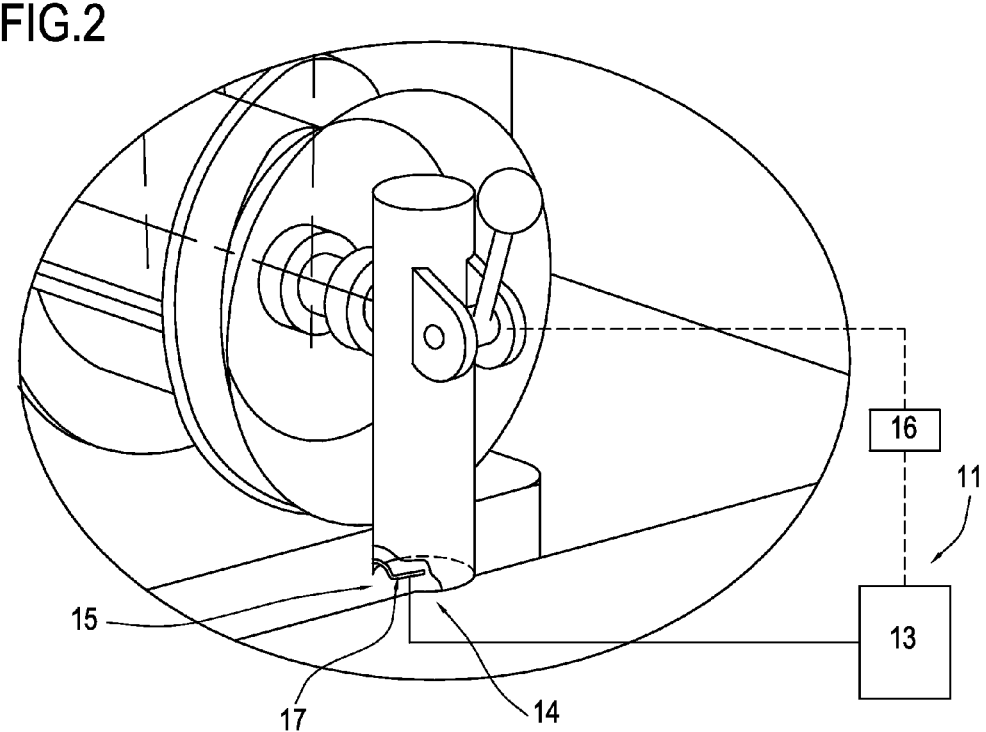
FIG. 2 shows a detail of the machine of FIG. 1.
Figure 3:
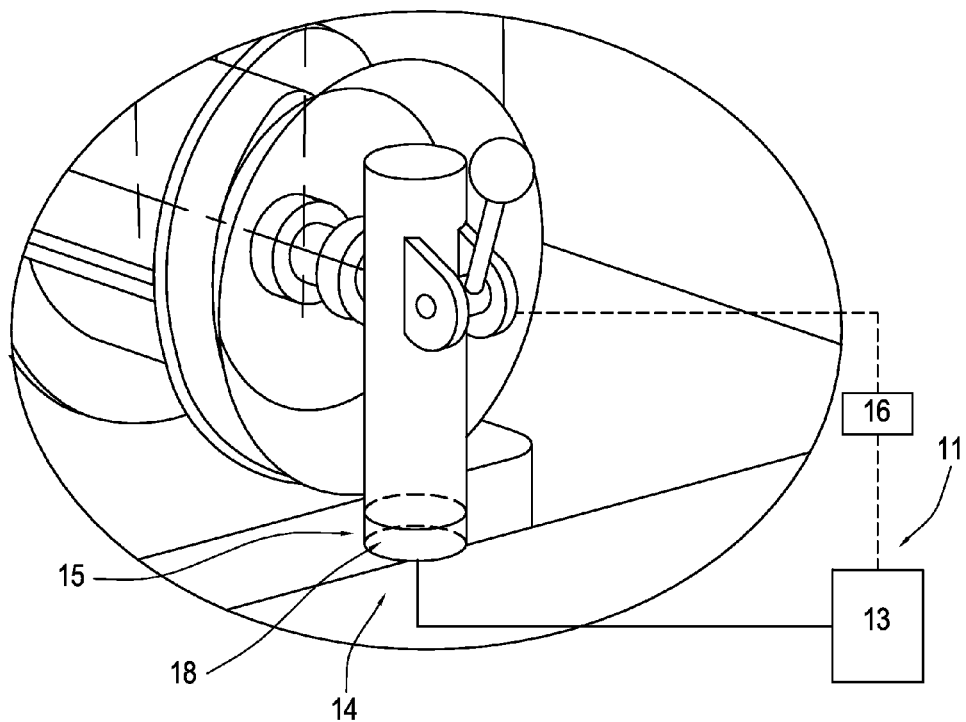
FIG. 3 shows an alternative embodiment of the detail of FIG. 2.

The counter 11 comprises a unit 13 for measuring the amount of product dispensed, that is, for actually counting and recording in a product register, and a unit 14 for enabling the measurement (FIGS. 2 and 3).

The aforesaid product register is built into the unit 13.

The unit 13 is connected on one side to the panel 12 and on the other to the unit 14.

The unit 14 is adapted to enable and disable the unit 13 based on the temperature of the product dispensed. More in detail, to enable the counter 11 to operate only when consumer product is dispensed and not, for example, when a washing fluid is dispensed, usually hot or at ambient temperature, the unit 14 enables counting and keeps it in an active state, only when, and as long as, the temperature of the product flowing out of the tap 4 is below a predetermined threshold. The threshold is preferably selected in a temperature range between 2° C. and 6° C. Within this range, the selected threshold is preferably 4° C.

For this purpose, the unit 14 comprises a temperature sensor 15 located along the product dispensing path, preferably at the dispensing tap 4.

When active, the unit 13 infers the amount of product dispensed on the basis of the total time the tap 4 remains open.

In effect, considering, with acceptable approximation, that the tap 4 works at a constant flow rate, like a plain switch, the amount of product dispensed by the tap 4 in a given time interval is proportional to the time interval itself.

In one embodiment, the instants at which counting is started and ended are determined by a signal applied to the unit 13 by a position sensor 16 connected to the tap 4. When the tap 4 is opened, if the temperature of the product dispensed is less than the aforementioned threshold, counting is started. Counting stops when the tap 4 is closed. At the same time, counting is not started if the sensor 15 detects a temperature that is greater than or equal to the predetermined threshold.

In a variant, the sensor 16 is not provided and the instants at which counting is started and ended are determined indirectly as a function of the current absorbed by the motor of the stirrer 8. In this case, too, counting is started only if the sensor 15 detects a temperature below the predetermined threshold.

In a simplified embodiment, the sensor 16 is not provided and the instants at which counting is started and ended are inferred from the output signal of the sensor 15. In this case, it is important for the sensor 15 to be located at the outlet opening of the tap 4. When the sensor 15, in contact with the product, detects a temperature below the predetermined threshold, the counter 11 is switched to an operating state to start counting. When no product is being dispensed or, for example, when the fluid being dispensed is a washing fluid, usually hot or at ambient temperature, and more generally, when the sensor 15 detects a temperature that is greater than or equal to the predetermined threshold, the counter 11 is switched to a non-operating condition.

In all the cases considered above, the temperature sensor 15 is preferably located inside the dispensing tap 4.

In the embodiment of FIG. 2, the sensor 15 comprises a needle 17 extending transversally inside the outlet opening of the tap 4.

In the embodiment of FIG. 3, on the other hand, the temperature sensor 15 is integrated in the dispensing tap 4. More specifically, the temperature sensor 15 forms an integral part of the outflow surface of the dispensing tap 4. More precisely, the sensor 15 is an annular end part 18 of the outlet opening of the tap 4. Alternatively, the sensor 15 is embedded in the wall that defines the outlet opening of the tap 4 so it is protected against fraudulent action or tampering that may alter its operation.

The panel 12 preferably has a display 19 for displaying the total amount measured and recorded.

In addition, or alternatively, to the display 19, the panel 12 has a port 20 for connection to an external reader 21 of the quantity of product dispensed.

The external reader 21 is a portable reader equipped with a readout display 22 for displaying the total amount measured and recorded, and/or a memory unit 23 for storing the value read. The reader 21 may also be equipped with a section for connecting up to the Internet in order to transmit the value read to a control station. The Internet connection is preferably wireless, for example through an HSPA modem. Data transmission may also occur on site, at the control station, by connecting the reader 21 to a receiving system and downloading the recorded data into it.

In addition, or alternatively, to the port 20, the counter 11 preferably has a section 24 for connection to the Internet so that the reading of the counter 11 may be taken remotely from the control station. In this case, too, the Internet connection is preferably wireless, for example through an HSPA modem.

The machine 1 described above achieves the preset aim. In effect, the machine manufacturer, based on the amount of ingredients supplied to the customer from a given time, which might, for example, be the effective date of the supply contract, may at any time check whether or not machine production has exceeded a limit value attributable to the production capacity of the machine with the amount of ingredients supplied. In other words, by simply taking readings from the counter 11, the machine manufacturer can check whether the customer/user has used only the product mixes or syrups supplied by the manufacturer itself.

The invention described above is susceptible of industrial application and may be modified and adapted in several ways without thereby departing from the scope of the inventive concept. Moreover, all the details of the invention may be substituted by technically equivalent elements.

What is claimed is:

1. A machine for making and dispensing iced food products, comprising:
    a tank for containing and processing an iced food product to be dispensed;
    a dispensing tap mounted near ache bottom of the tank;
    a power-driven stirring mechanism associated with the tank;
    an evaporator of a cooling circuit associated with the tank; and
    a counter of an amount of the iced food product dispensed, the counter including:
        a unit for measuring the amount of iced food product dispensed; and
        a unit for enabling measurement having a temperature sensor located along a product dispensing path for sensing a temperature of a material being dispensed through the product dispensing path;
        the unit for measuring operating to count an amount of the material being dispensed through the product dispensing path when the sensed temperature of the material being dispensed is below a predetermined threshold, thereby indicating that the material being dispensed is the iced food product;
        the unit for measuring not counting the amount of the material being dispensed through the product dispensing path when the sensed temperature of the material being dispensed is above the predetermined threshold, thereby indicating that the material being dispensed is other than the iced food product.

2. The machine according to claim 1, wherein the temperature sensor is located at the dispensing tap.

3. The machine according to claim 2, wherein the temperature sensor is integrated in the dispensing tap.

4. The machine according to claim 3, wherein the temperature sensor is located inside the dispensing tap.

5. The machine according to claim 4, wherein the temperature sensor forms an integral part of an outflow surface of the dispensing tap.

6. The machine according to claim 3, wherein the temperature sensor is embedded in a wall that forms an outlet opening of the dispensing tap.

7. The machine according to claim 1, wherein the counter includes a port for connection to an external reader of the amount of product dispensed.

8. The machine according to claim 1, wherein the counter includes an Internet connection for remote reading of the amount of product dispensed.

9. The machine according to claim 2, wherein the temperature sensor is located inside the dispensing tap.

10. The machine according to claim 9, wherein the temperature sensor forms an integral part of an outflow surface of the dispensing tap.

11. The machine according to claim 2, wherein the counter includes a port for connection to an external reader of the amount of product dispensed.

12. The machine according to claim 3, wherein the counter includes a port for connection to an external reader of the amount of product dispensed.

13. The machine according to claim 4, wherein the counter includes a port for connection to an external reader of the amount of product dispensed.

14. The machine according to claim 2, wherein the counter includes an Internet connection for remote reading of the amount of product dispensed.

15. The machine according to claim 3, wherein the counter includes an Internet connection for remote reading of the amount of product dispensed.

16. The machine according to claim 4, wherein the counter includes an Internet connection for remote reading of the amount of product dispensed.

17. The machine according to claim 1, wherein the iced food product includes at least one chosen from granitas, sorbets and slush drinks.

18. A method for making and dispensing iced food products, comprising:

providing a tank for containing and processing an iced food product to be dispensed;

providing a dispensing tap mounted near a bottom of the tank;

providing a power-driven stirring mechanism associated with the tank;

providing an evaporator of a cooling circuit associated with the tank; and providing a counter of an amount of the iced food product dispensed, the counter including:
   a unit for measuring the amount of iced food product dispensed; and
   a unit for enabling measurement having a temperature sensor located along a product dispensing path for sensing a temperature of a material being dispensed through the product dispensing path;

operating the unit for measuring to count an amount of the material being dispensed through the product dispensing path when the sensed temperature of the material being dispensed is below a predetermined threshold, thereby indicating that the material being dispensed is the iced food product;

operating the unit for measuring to not count the amount of the material being dispensed through the product dispensing path when the sensed temperature of the material being dispensed is above the predetermined threshold, thereby indicating that the material being dispensed is other than the iced food product.

* * * * *